Nov. 15, 1932.   H. G. B. MAHON   1,887,654
FURNACE OBSERVATION WINDOW
Filed Nov. 13, 1930   2 Sheets-Sheet 1
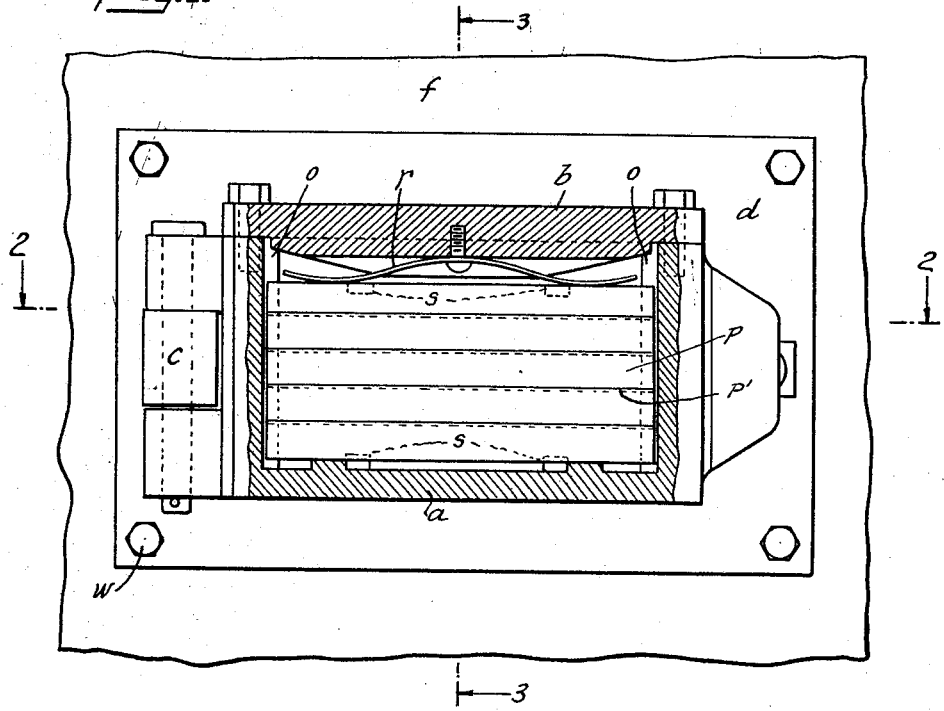
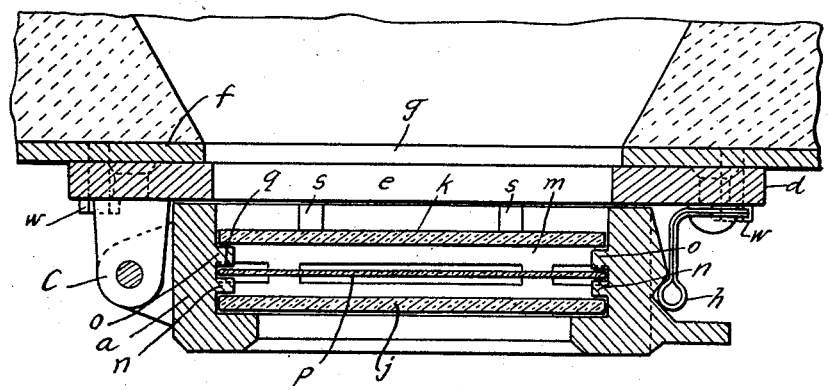
INVENTOR
Herbert George Basil Mahon
BY
Pennie, Davis, Marvin & Edmonds
ATTORNEYS Nov. 15, 1932.    H. G. B. MAHON    1,887,654
FURNACE OBSERVATION WINDOW
Filed Nov. 13, 1930    2 Sheets-Sheet 2
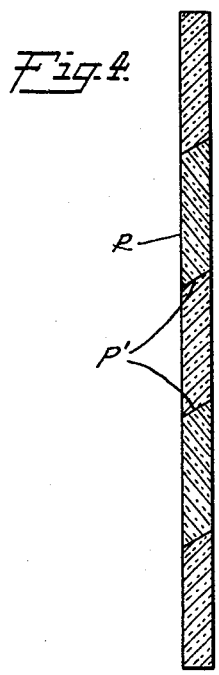
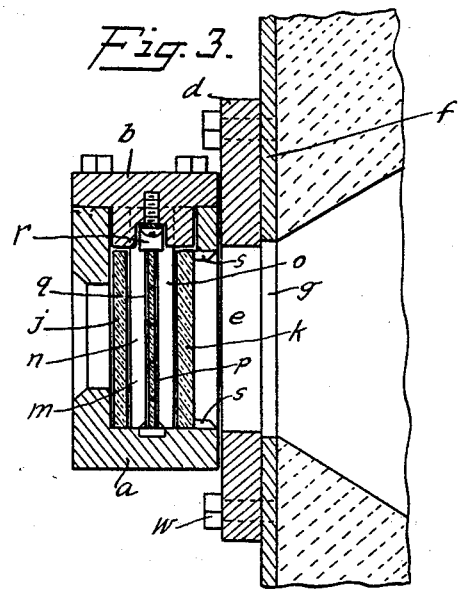
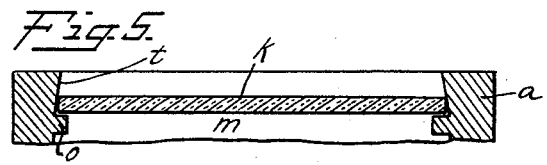
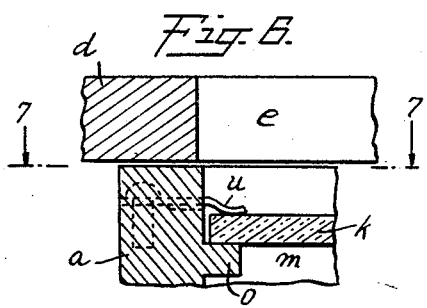
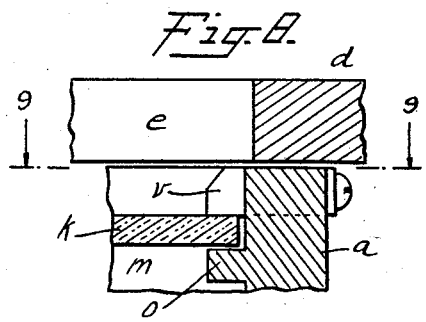
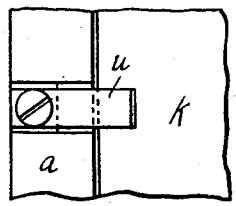
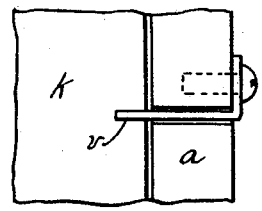
INVENTOR
Herbert George Basil Mahon
BY
Pennie, Davis, Marvin Edmonds
ATTORNEYS Patented Nov. 15, 1932

1,887,654

UNITED STATES PATENT OFFICE

HERBERT GEORGE BASIL MAHON, OF GOSFORTH, NEWCASTLE-UPON-TYNE, ENGLAND

FURNACE OBSERVATION WINDOW

Application filed November 13, 1930, Serial No. 495,377, and in Great Britain November 22, 1929.

This invention relates to furnace observation windows, and has for its object to provide an improved construction whereby the operator can view the interior of the furnace in comfort, without causing eye-strain, and also without it being necessary to open a fire door or the like and admit cold air to the furnace with consequent loss in efficiency.

Tinted glass has been used in furnace observation windows, but, owing to the intense heat of the furnace, it is difficult to prevent cracking of the glass when it is exposed to the high temperature radiations from the furnace. The tinted glass has been to some extent protected by a sheet of clear fireproof glass disposed between it and the furnace, and means have been proposed for reducing the heat both on the furnace side of the fireproof glass and also on that remote from the furnace, but, when observing high temperature furnaces, such means have failed to avoid cracking of the tinted glass and, in many instances of the clear glass also.

It has been found that the cracking of the tinted glass is due largely to the marked difference in temperature between the furnace side and the outer side of the glass which is intensified if cold air strikes the outer side. Further, where the fireproof glass is let into a frame, the temperature of the edge portions of the glass sheet which are screened by the frame is, for some time after exposure to the furnace heat, less than that of the unscreened central portion of the sheet and stresses are set up in the glass which frequently result in cracking.

The device of the present invention is designed to prevent cracking of either the clear fireproof glass or the tinted glass.

A furnace observation window in accordance with my invention is provided with one or more semi-athermanous fireproof plates mounted so that the edge portions of the plate next the furnace are unscreened and its whole area is simultaneously exposed to the radiant heat from the furnace and thus becomes uniformly heated, cracking due to its central portion being more rapidly heated than its edge portions being avoided. The fireproof glass plate next the furnace is retained in position by projections, clips, locating pieces or similar members, or by the coaction with said plate of tapered surfaces. Where the radiant heat from the furnace is very intense, one or two additional semi-athermanous fireproof plates may be fixed immediately behind the plate nearest the furnace. A chamber is formed by mounting a glass plate on that side of said first-mentioned plate which is remote from the furnace, and admission of air into said chamber is prevented or restricted. A tinted glass element is disposed in the chamber, and said element is composed of strips of tinted glass the abutting edges of which are bevelled. The chamber may be made liquid-tight and adapted to be filled with a suitable liquid.

The invention will be better understood from the detail description which follows, reference being had to the accompanying drawings in which:

Fig. 1 is a front view of the fire door of a furnace equipped with an observation window of the invention, the window being shown in section;

Fig. 2 is a cross-section of the door shown in Fig. 1 taken on the plane 2—2 of that figure;

Fig. 3 is a cross section taken on the plane 3—3 of Fig. 1;

Fig. 4 is a cross-sectional view detail of the tinted glass element constituting a part of the observation window;

Fig. 5 is a detail cross section of an observation window employing alternative means for retaining its glass plate in position;

Fig. 6 is a detail showing similar to Fig. 5 but illustrating other means for securing the glass plate of the window;

Fig. 7 is a view taken on the plane 7—7 of Fig. 6;

Fig. 8 shows still different means for holding the glass plate of the window in place; and Fig. 9 is a view taken on the plane 9—9 of Fig. 8.

Referring to the said drawings, in the example therein illustrated, the furnace observation window comprises a box $a$ open at front and rear. It has a removable cover $b$ and may be of cast iron. The box is hinged at $c$ to a frame $d$ having a rectangular opening $e$ and suitably attached to the furnace wall $f$ over an opening $g$ therein. The box is retained in normal position over the opening $e$ by a spring catch $h$ mounted on the plate $d$ opposite to the hinge. In the box $a$ are mounted a pair of clear fireproof glass plates $j$, $k$ which are semi-athermanous and are spaced to form a chamber $m$. The plates $j$, $k$ are inserted into the box from above when the cover $b$ is removed and engage vertical ribs $n$, $o$ in the interior of the box. The tinted glass element $p$ is interposed between the clear fireproof glass plates $j$, $k$ and engages in a groove $q$ between the ribs $n$, $o$.

An additional plate or plates of clear fireproof glass of equal size, or approximately so, to that of the clear glass plate $k$ above described may be mounted on the furnace side of the chamber $m$ for additional protection where the radiant heat from the furnace is very intense, which additional clear glasses may also form closed or substantially closed chambers. Where such an additional fireproof plate (or plates) is provided, it is mounted directly behind the plate $k$, the box $a$ being made wider to accommodate said additional plate or plates.

The tinted glass screening element $p$ is in the form of a series of narrow strips set edge to edge, as shown best in Fig. 4. By this arrangement surface tension is minimized. The abutting edges of the strips are bevelled as shown at $p^1$ so that, should slight distortion of the strips occur due to the heat, the bevelled edges compensate for such distortion and maintain the continuity of the element and prevent white light becoming visible therethrough when the element is viewed in the horizontal direction. The strips are kept together by a spring $r$ attached to the cover $b$ of the box.

The clear fireproof glass plate $k$ next the furnace is approximately equal in size to that of the opening $e$ in the frame $d$, and the plate is mounted in the box $a$ so that its edge portions are unscreened from the furnace and its whole area is exposed to the radiant heat therefrom. The plate thus becomes uniformly heated on exposure to the furnace, and cracking due to its central portion being more rapidly heated than its edge portions is avoided.

The plate may be secured in position in any manner which leaves its edges uncovered in the direction of the furnace; for example, I may provide pairs of small projections $s$ on the upper and lower margins of the rear opening of the box on the inner side of the plate as shown in Figs. 1, 2 and 3, said projections being as small as consistent with security. The plate is inserted between them and the rib $o$. Or I may taper the rear opening of the box towards the furnace as shown at $t$ in Fig. 5 so that the plate $k$ bears against the converging faces of said opening. Alternatively, I may use small clips $u$ as shown in Figs. 6 and 7, or steel locating pieces $v$ set edgeways to the glass as shown in Figs. 8 and 9 or other similar members which are so small as not to screen any appreciable part of the plate from the heat rays and to allow the whole of the plate to become uniformly heated.

The clear glass plate $j$ forming the outer side of the chamber $m$ is fixed in the box $a$ in any suitable manner. The plates $j$ and $k$ may be jointed into the box so as to be substantially permanently fixed therein.

The tinted glass element $p$, being interposed between the clear fireproof glass plates $j$, $k$ which form a substantially closed chamber $m$, is not exposed to cold air. In some cases the chamber $m$ in which the tinted glass is mounted may be made liquid-tight and filled with a suitable liquid.

The furnace observation window of the present invention is detachably connected to the furnace wall or casing $f$ by means of bolts $w$.

In the construction above described, it will be found that the tinted glass will not crack even when suddenly exposed to high temperatures, partly because of the temperature reduction due to the semi-athermanous glass plate or plates through which the heat rays pass before striking the tinted glass, and also because the tinted glass is able to take up the heat evenly and rise in temperature uniformly owing to its being in a closed or substantially closed chamber the general temperature of which also rises uniformly and remains high so long as it is exposed to the heat rays and is not suddenly cooled by a draught of atmospheric air or a sudden reduction of furnace temperature, as for example, when the air fans are shut down. And, as before stated, by making the tinted glass partition in sections which are arranged in edge-overlapping relation any distortion due to the heat prevents white light from becoming visible between the abutting edges of the strips. The term "box" is used throughout this specification and in the claims to connote a frame or panel of any desired shape, which need not necessarily be rectangular, as illustrated, and which may be of any suitable size, thickness or transverse dimension. Furthermore, the glass plates and the tinted glass partition may, if desired, be carried within frames which are directly supported by the box.

Where the chamber containing the tinted glass is filled with liquid, the protection against cracking is even more effective. The enclosure of the tinted glass also protects it from mechanical breakage, and it is possible to use thinner glass than customary which again minimizes the risk of cracking upon exposure to extremely high temperatures.

While the glass plates *j* and *k* manifestly will be transparent, this does not necessarily imply absolutely clear. By "transparent" is meant such perviousness to light as to permit the fires of the furnace to be viewed from the opposite side of a plate.

I claim:

1. A furnace observation window comprising a box surrounding an opening in the furnace, a transparent plate supported by the box, and means for retaining the plate in assembly with the box, said means comprising beveled surfaces upon the box and inappreciably overhanging the edge portions of the plate on its side exposed to the furnace fire so that substantially the entire surface of the plate is uniformly exposed to the heat of the furnace.

2. A furnace observation window comprising a box surrounding an opening in the furnace and a pair of spaced transparent plates supported in substantially parallelism within the box and transversely of the furnace opening, said plates defining in combination with the box a closed chamber.

3. A furnace observation window comprising a box surrounding an opening in the furnace, a pair of spaced transparent plates supported in substantially parallelism within the box and transversely of the furnace opening, said plates defining in combination with the box a closed chamber, and means inappreciably overlapping the surface of the plate nearest the furnace opening such that approximately the entire marginal portion of the plate is exposed to the heat of the furnace.

4. A furnace observation window comprising a box surrounding an opening in the furnace, a pair of spaced transparent plates supported in substantially parallelism within the box and transversely of the furnace opening, and a tinted transparent screening element disposed within the box intermediate the plates.

5. A furnace observation window comprising a box surrounding an opening in the furnace, a pair of spaced transparent plates supported in substantially parallelism within the box and transversely of the furnace opening, said plates defining in combination with the box, a closed chamber, and a tinted glass element disposed within the chamber and intermediate the plates.

6. A furnace observation window comprising a box surrounding an opening in the furnace, and a screening element supported by the box and transversely of the furnace opening, said element comprising a series of transparent strips arranged in overlapping edge-to-edge contact.

7. A furnace observation window comprising a box surrounding an opening in the furnace, and a screening element supported by the box and transversely of the furnace opening, said element comprising a series of transparent strips arranged in edge-to-edge contact, the abutting edges of adjacent strips being beveled to provide a slight overlap between the strips.

8. A furnace observation window comprising a box surrounding an opening in the furnace, a pair of spaced transparent plates supported in substantially parallism within the box and transversely of the furnace opening, said plates defining in combination with the box a closed chamber, and a screening element interposed between the plates, said element comprising a plurality of strips of tinted glass arranged in horizontal edge-to-edge contact, the abutting edges of the strips being disposed at an angle so as to provide a slight overlapping area between the strips.

9. A furnace observation window comprising a box surrounding an opening in the furnace, a pair of spaced transparent plates supported in substantially parallelism within the box and transversely of the furnace opening, said plates defining in combination with the box a closed chamber, means inappreciably overlapping the surface of the plate nearest the furnace opening such that approximately the entire marginal portion of the plate is exposed to the heat of the furnace, a screening element interposed between the plates, said element comprising a plurality of strips of tinted glass arranged in edge-to-edge contact, the abutting edges of adjacent strips being beveled so as to slightly overlap, and means for resiliently maintaining said strips in assembly.

10. A furnace observation window comprising a box surrounding an opening in the furnace and a pair of spaced transparent plates supported in substantially parallelism within the box and transversely of the furnace opening so as to define a substantially closed compartment therebetween, means retaining the plate nearest the furnace fire in assembly with the box comprising a plurality of pins associated with the box having an inappreciable area of contact with the side of the plate facing furnace fire so as to maintain substantially the entire surface of the plate exposed to the heat rays.

11. A furnace observation window comprising a box surrounding an opening in the furnace, a transparent plate supported by the box and exposed to the direct rays of the fire within the furnace, and means for retaining said transparent plate in assembly with the frame comprising a plurality of pins associated with the box having an inappreciable area of contact with the side of the plate facing the furnace fire so as to maintain substantially the entire surface of the plate exposed to the heat rays.

12. A furnace observation window comprising a box surrounding an opening in the furnace, a transparent plate supported by the box, and means for retaining the plate in assembly with the box, said means comprising beveled shoulders within the box and inappreciably overhanging a marginal portion of the plate.

13. A furnace observation window comprising a box surrounding an opening in the furnace, a transparent plate supported by the box, and means for retaining the plate in assembly with the box, said means comprising beveled shoulders within the box and inappreciably overhanging a marginal portion of the plate on the side of the plate which is exposed to the furnace fire.

14. A furnace window comprising a box surrounding an opening in the furnace, a pair of spaced partitions supported within the box and transversely of the furnace opening, one of said partitions comprising a plurality of sections of transparent material arranged in slightly overlapping relation with each other.

15. A furnace window comprising a box surrounding an opening in the furnace, a pair of spaced transparent partitions supported in substantially parallelism within the box and transversely of the furnace opening, one of said partitions comprising a plurality of strips of transparent material arranged in edge-to-edge overlapping relation, said last partition being farthest removed from the inside of the furnace.

16. A furnace window comprising a box surrounding an opening in the furnace, a pair of spaced transparent plates supported in substantially parallelism within the box and transversely of the furnace opening, said plates defining in combination with the box a closed chamber and a screen element interposed between the plates, said element comprising a plurality of strips of tinted glass arranged in marginal overlapping contact.

17. A furnace observation window comprising a box surrounding an opening in the furnace, a screening element supported by the box and transversely of the furnace opening, said element comprising a series of transparent tinted strips arranged edge to edge, the abutting edges being beveled to provide a slight overlap between the strips, and spring means for resiliently maintaining said strips in contact with each other.

In testimony whereof I affix my signature.

HERBERT GEORGE BASIL MAHON.